United States Patent
Modroukas et al.

(10) Patent No.: US 10,946,359 B2
(45) Date of Patent: Mar. 16, 2021

(54) FUEL REFORMATION FOR USE IN HIGH SPEED PROPULSION SYSTEMS

(71) Applicant: Innoveering, LLC, Ronkonkoma, NY (US)

(72) Inventors: Dean Modroukas, Scarsdale, NY (US); Robert Bakos, Wading River, NY (US)

(73) Assignee: INNOVEERING, LLC, Bohemia, NY (US)

( * ) Notice: Subject to any disclaimer, the term of this patent is extended or adjusted under 35 U.S.C. 154(b) by 85 days.

(21) Appl. No.: 16/243,679

(22) Filed: Jan. 9, 2019

(65) Prior Publication Data

US 2019/0209997 A1 Jul. 11, 2019

Related U.S. Application Data

(60) Provisional application No. 62/615,146, filed on Jan. 9, 2018.

(51) Int. Cl.
| | | |
|---|---|---|
| *B01J 19/00* | (2006.01) | |
| *F02C 7/22* | (2006.01) | |
| *B01J 19/26* | (2006.01) | |
| *F02K 7/16* | (2006.01) | |
| *F28F 1/12* | (2006.01) | |
| *B01J 12/00* | (2006.01) | |
| *F02K 7/10* | (2006.01) | |

(Continued)

(52) U.S. Cl.
CPC ......... *B01J 19/0093* (2013.01); *B01J 12/005* (2013.01); *B01J 12/007* (2013.01); *B01J 19/2485* (2013.01); *B01J 19/26* (2013.01); *F02C 7/22* (2013.01); *F02K 7/10* (2013.01); *F02K 7/16* (2013.01); *F28D 7/106* (2013.01); *F28F 1/128* (2013.01); *B01J 2219/00835* (2013.01); *B01J 2219/2428* (2013.01); *B01J 2219/2429* (2013.01)

(58) Field of Classification Search
CPC .... B01J 19/0093; B01J 12/005; B01J 12/007; B01J 19/2485; B01J 19/26; B01J 2219/00835; B01J 2219/2428; B01J 2219/2429; F02C 7/22; F02K 7/10; F02K 7/16; F28D 7/106; F28F 1/128
USPC ......................................................... 123/3
See application file for complete search history.

(56) References Cited

U.S. PATENT DOCUMENTS

| | | | | |
|---|---|---|---|---|
| 6,171,574 B1 * | 1/2001 | Juda | ........................ | B01J 8/009 423/648.1 |
| 2001/0018141 A1 * | 8/2001 | Kobayashi | ........ | H01M 8/04022 431/7 |

(Continued)

*Primary Examiner* — Joseph J Dallo
*Assistant Examiner* — Yi-Kai Wang
(74) *Attorney, Agent, or Firm* — Carter, DeLuca & Farrell LLP; George Likourezos; Jason B. Scher

(57) ABSTRACT

A fuel reformation system includes a fuel delivery system that supports fuel, an oxidizer delivery system that supports an oxidizer, a mixer/vaporizer system in fluid communication with the fuel delivery system and the oxidizer delivery system, and a fuel processing reactor system. The mixer/vaporizer system receives the oxidizer from the oxidizer delivery system and the fuel from the fuel delivery system to mix and vaporize the oxidizer and fuel into a first effluent. The fuel processing reactor system receives the first effluent and reacts with the first effluent to generate a second effluent in the form of hot syngas for selective injection into a high speed, air-breathing propulsion system.

24 Claims, 10 Drawing Sheets

(51) Int. Cl.
  *F28D 7/10*  (2006.01)
  *B01J 19/24* (2006.01)

(56) References Cited

U.S. PATENT DOCUMENTS

| | | | | |
|---|---|---|---|---|
| 2008/0253944 | A1* | 10/2008 | Whyatt | C01B 3/382 |
| | | | | 422/224 |
| 2009/0223861 | A1* | 9/2009 | Sugiura | H01M 8/0612 |
| | | | | 208/134 |
| 2012/0052002 | A1* | 3/2012 | Lee | F23C 13/00 |
| | | | | 423/648.1 |
| 2014/0106962 | A1* | 4/2014 | Durante | C10G 3/48 |
| | | | | 502/335 |
| 2014/0165569 | A1* | 6/2014 | Hsu | F01B 21/04 |
| | | | | 60/698 |
| 2015/0122364 | A1* | 5/2015 | Cheatham, III | F16L 55/1283 |
| | | | | 138/98 |
| 2016/0109134 | A1* | 4/2016 | Suzuki | F02C 3/205 |
| | | | | 60/740 |
| 2017/0183228 | A1* | 6/2017 | Lin | B01J 19/242 |
| 2018/0179961 | A1* | 6/2018 | Lavertu, Jr. | F02C 3/165 |

* cited by examiner

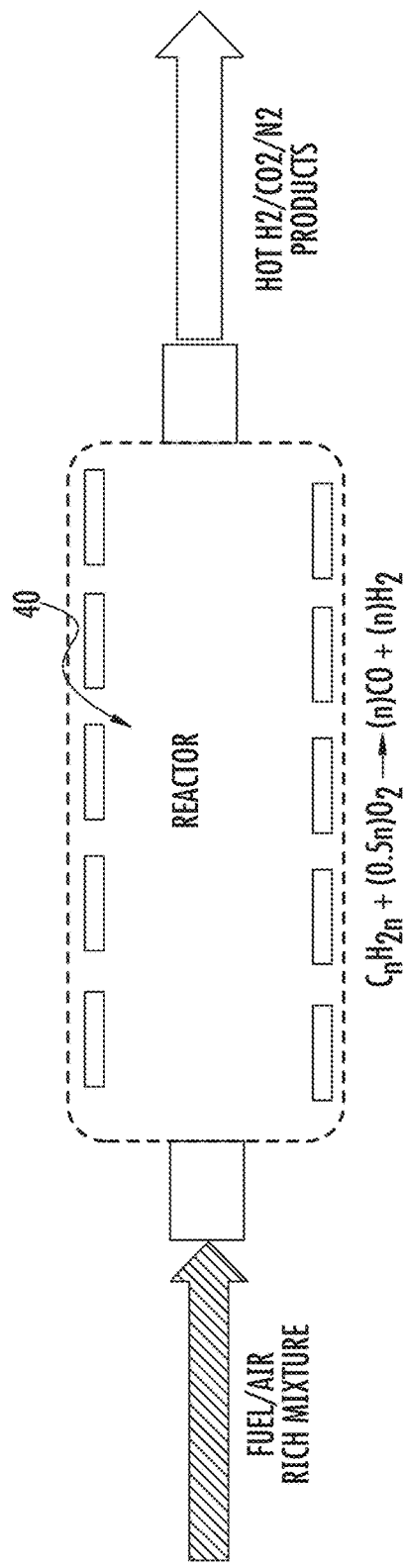
FIG. 4
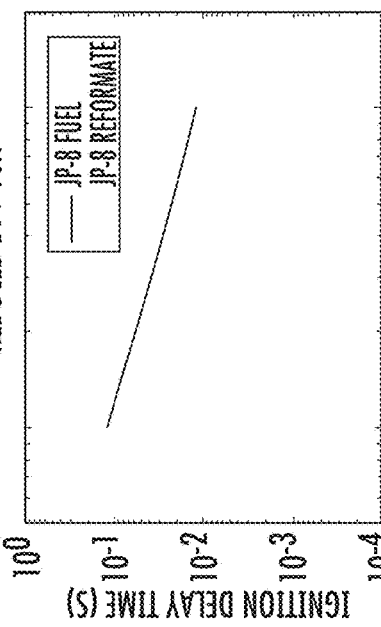
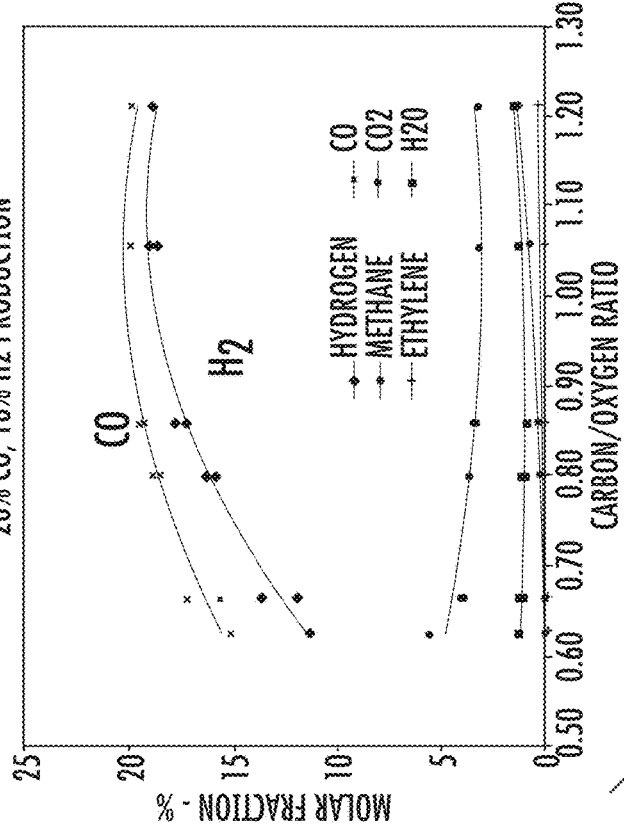
FIG. 5

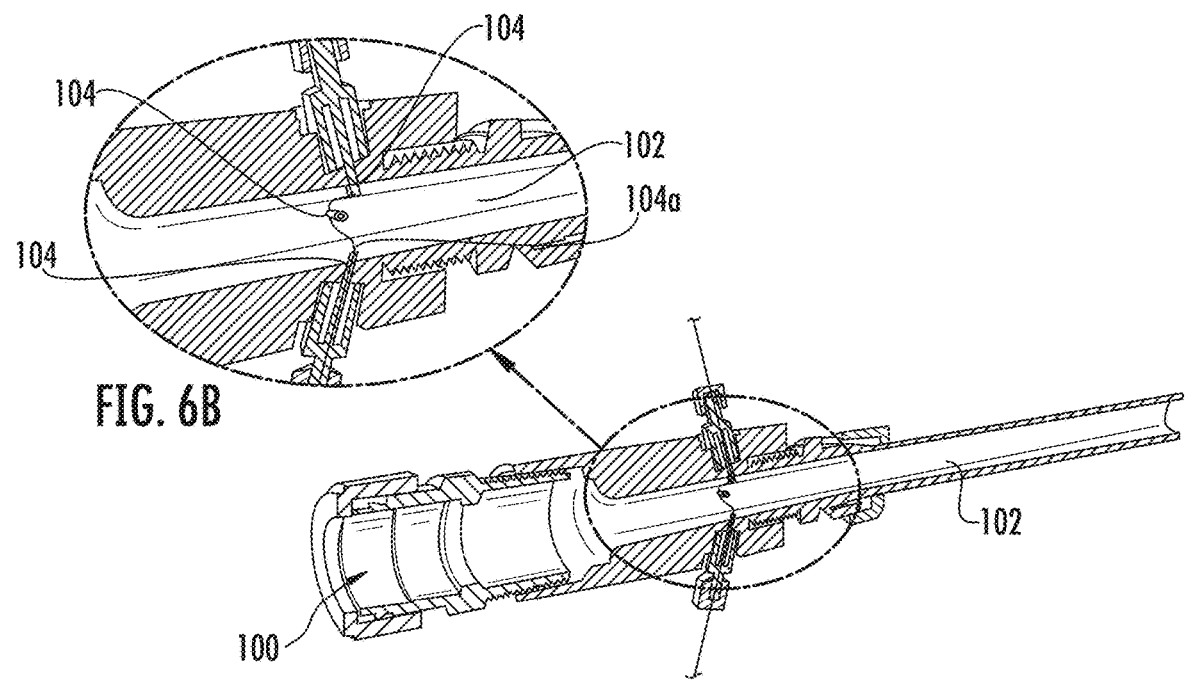
FIG. 6B
FIG. 6A
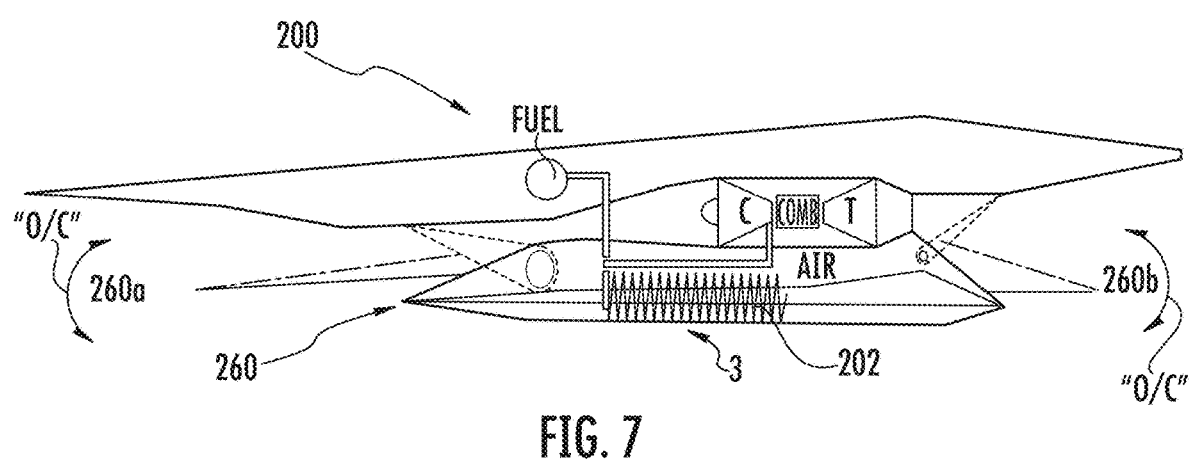
FIG. 7

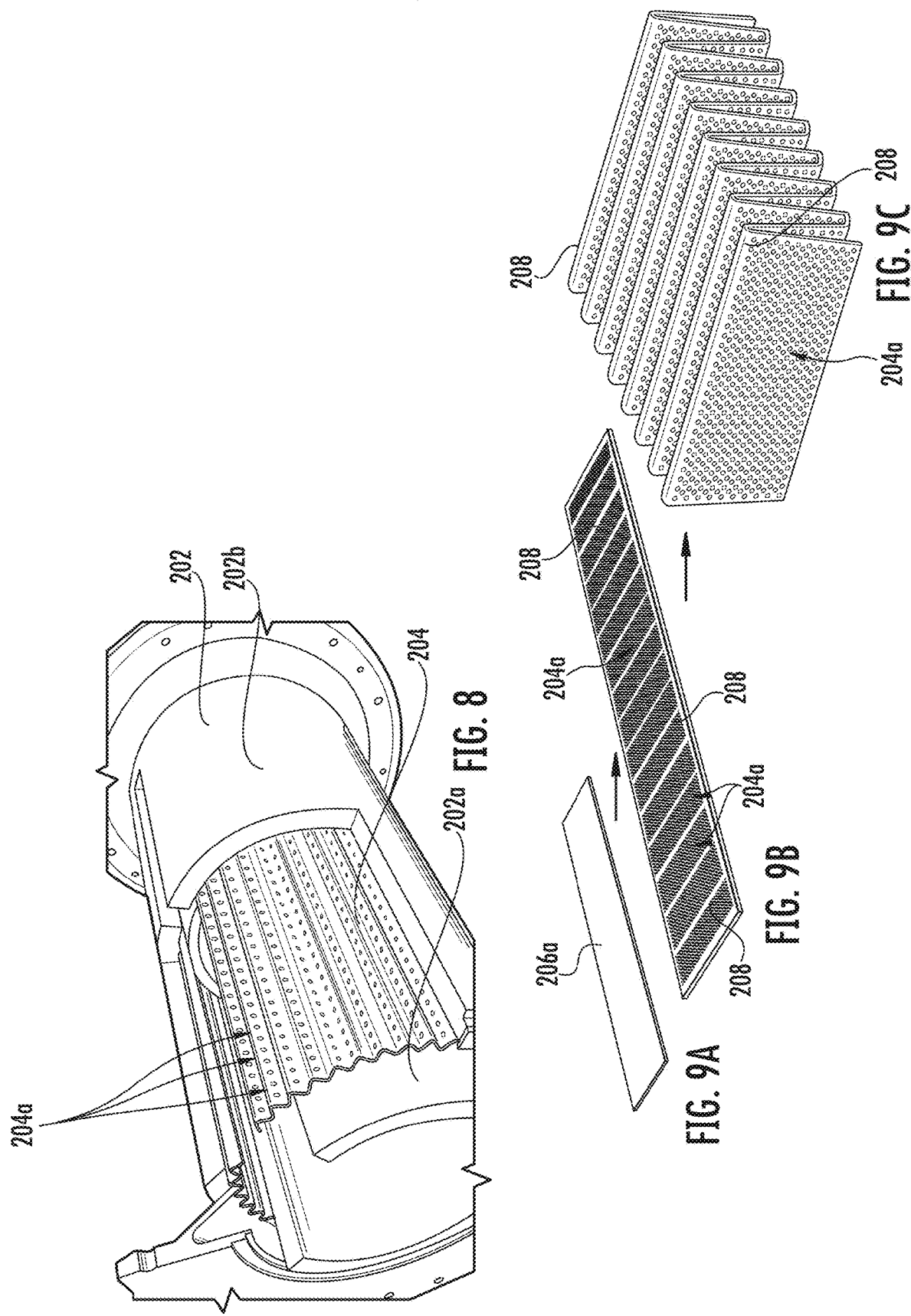

FUEL REFORMATION FOR USE IN HIGH SPEED PROPULSION SYSTEMS

TECHNICAL FIELD

This disclosure relates generally to catalytic fuel reformation and systems for use in high speed propulsion systems.

BACKGROUND

Liquid hydrocarbon fuels are attractive candidates for the lower range of hypersonic flight (M<10) due to their high volumetric energy density, system packaging and simplicity of operational logistics. These fuels, however, suffer from the need for substantial residence times needed for vaporization and reaction and the availability of these times is challenging in high-speed air-breathing engines, for example, dual mode ramjet, scramjet or rotating detonation combustors. Furthermore, at lower Mach flight conditions (M2-M4) where the air-breathing is taking over from a boost propulsion system, total temperatures and engine structures are cold relative to cruise conditions.

SUMMARY

In accordance with this disclosure, catalytic partial oxidation (CPOX) provides the ability to reform liquid fuel on-demand to generate hot (—up to 1900° F.) hydrogen-rich effluent that (i) aids in ignition, (ii) enhances reaction rate and (iii) helps to create a fuel or fuel mixture that burns more efficiently over a broader range of operating conditions. CPOX also provides rapid, self-sustaining light-off at low temperatures (typically 530° F.) for most hydrocarbon fuels. These light-off temperatures can be easily obtained from high temperature on-board bleed air or glow-plug arrangement, for example. According to aspects of this disclosure, CPOX technology is applied toward direct injection and as an "on-demand" barbotage gas alternative. Further CPOX technology of this disclosure supports compact reactor embodiments: external or internal to the combustor. In some aspects of this disclosure, CPOX technology is leveraged during propulsion mode transition by partial oxidation of parent fuel to enable a wider stability envelope at lower Mach/q levels while simultaneously pre-heating key propulsion components such as the combustor or engine walls.

According to one aspect, this disclosure is directed to a fuel reformation system including a fuel delivery system, an oxidizer delivery system, a mixer/vaporizer system, and a fuel processing reactor system. The fuel delivery system is configured to support fuel. The oxidizer delivery system is configured to support an oxidizer. The mixer/vaporizer system in fluid communication with the fuel delivery system and the oxidizer delivery system. The mixer/vaporizer system is configured to receive the oxidizer from the oxidizer delivery system and the fuel from the fuel delivery system to mix and vaporize the oxidizer and fuel into a first effluent. The fuel processing reactor system is configured to receive the first effluent and react with the first effluent to generate a second effluent in the form of hot syngas for selective injection into a high speed, air-breathing propulsion system (e.g., dual mode ramjet, scramjet or rotating detonation engine).

In some embodiments, the fuel reformation system further includes a catalytic partial oxidation reactor that may be configured to receive the fuel and oxidizer to deliver the hot syngas for selective injection into the high speed air-breathing propulsion system. The catalytic partial oxidation reactor may be configured to deliver the hot syngas directly to the high speed, air-breathing propulsion system to aid the combustion of a primary liquid fuel injected into the high speed, air-breathing propulsion system through a separate stream, a barbotaged injection scheme, or combinations thereof The fuel reformation system may further include the high speed, air-breathing propulsion system, wherein the hot syngas may be configured to preheat the high speed, air-breathing propulsion system when injected into the high speed, air-breathing propulsion system. The high speed, air-breathing propulsion system may be a dual mode ramjet, a scramjet, or a rotating detonation engine.

In some embodiments, the fuel processing reactor system may be insulated.

In embodiments, the mixer/vaporizer may be insulated.

In certain embodiments, the oxidizer is off-board air, an onboard oxidizer, or combinations thereof.

In various embodiments, the fuel processing reactor system includes a steam reformer reactor configured to receive the fuel and water within a heat exchanger of the high speed, air-breathing propulsion system, the steam reformer reactor configured to simultaneously cool combustor walls of the high speed, air-breathing propulsion system and deliver the hot syngas for selective injection into the high speed, air-breathing propulsion system.

In some embodiments, the fuel processing reactor system is configured to deliver the hot syngas directly to the high speed, air-breathing propulsion system to aid the combustion of a primary liquid fuel injected into the high speed, air-breathing propulsion system through a separate stream, a barbotaged injection scheme, or combinations thereof.

In embodiments, the first effluent may have a fuel-air equivalence ratio that is between about 2 and about 6. In some embodiments, the fuel-air equivalence ratio is about 3.

In some embodiments, the fuel processing reactor system may include a reactor that may support a foil catalyst including a metal substrate layer, an interdiffusion layer, and a catalytically active substance layer.

In embodiments, the fuel processing reactor system may include a reactor tube assembly having a diameter as small as one inch.

In some embodiments, the fuel processing reactor system may be configured to provide a residence time less than 1 second. The residence time may be less than 10 ms.

In various embodiments, the mixer/vaporizer system may support hypodermic injectors for delivering the fuel into a vaporizer tube of the mixer/vaporizer system. The hypodermic injectors may include beveled tips configured to shear a fuel stream of the fuel for atomization by the oxidizer.

In embodiments, the fuel processing reactor system may include an autothermal reformer configured to receive the fuel and water within a catalytic reactor of the high speed, air-breathing propulsion system. The autothermal reforming reactor may be configured to deliver the hot syngas for selective injection into the high speed, air-breathing propulsion system.

In some embodiments, the fuel processing reactor system is configured to deliver the hot syngas directly to the high speed, air-breathing propulsion system to aid the combustion of a primary liquid fuel injected into the high speed, air-breathing propulsion system through a separate stream, a barbotaged injection scheme, or combinations thereof.

In embodiments, the fuel processing reactor system may enable preheating and vaporization of parent liquid fuel for enhanced atomization and combustion into the high speed air-breathing propulsion system.

In some embodiments the fuel reformation system may further include a controller. The controller may include a processor in electrical communication with memory. The memory may have instructions stored thereon, which when executed by the processor, cause the fuel reformation system to inject the hot syngas into the high speed, air-breathing propulsion system.

According to another aspect of the disclosure, a method for heating a high speed, air-breathing propulsion system includes delivering jet fuel and an oxidizer (e.g., air from the high speed intake system) to a mixer/vaporizer to generate a first effluent; delivering the first effluent to a fuel processing reactor system to generate a second effluent in the form of a hot syngas; and selectively injecting the hot syngas into the high speed, air-breathing propulsion system.

The method may further include passing the reactants over a catalyst (e.g., a thin film) in a reactor of the fuel processing reactor system, wherein the catalyst includes a metal substrate layer, an interdiffusion layer, and a catalytically active substance layer.

According to yet another aspect of the disclosure, a heat exchanger for a high speed, air-breathing propulsion system is provided. The heat exchanger includes an outer engine wall, an inner engine wall, and a perforated foil catalyst supported between the inner and outer engine walls. The perforated foil catalyst includes a metal substrate layer, an interdiffusion layer, and a catalytically active substance layer that is configured to cause an exothermic catalytic partial oxidation reaction when the high speed, air-breathing propulsion system is traveling at a first set of Mach numbers and an endothermic reaction when the high speed, air-breathing propulsion system is traveling at a second set of Mach numbers that are higher than the first set of Mach numbers.

In accordance with yet another aspect of this disclosure, a combustor heat exchanger for a high speed, air-breathing propulsion system is provided. The combustor heat exchanger includes a metal substrate layer coated with catalyst and defining fuel cooled channels, the catalyst including an interdiffusion layer and a catalytically active layer that are configured to cause an exothermic catalytic partial oxidation reaction when the high speed, air-breathing propulsion system is traveling at a first set of Mach numbers and an endothermic reaction when the high speed, air-breathing propulsion system is traveling at a second set of Mach numbers that are higher than the first set of Mach numbers.

Other aspects, features, and advantages will be apparent from the description, the drawings, and the claims that follow.

BRIEF DESCRIPTION OF THE DRAWINGS

The accompanying drawings, which are incorporated in and constitute a part of this specification, illustrate embodiments of the disclosure and, together with the detailed description of the embodiments given below, serve to explain the principles of the disclosure.

FIG. 4 is a schematic view of the indicated area of detail shown in FIGS. 2A and 2B;

FIG. 5 illustrates charts of typical output results and corresponding ignition delay time results output by the fuel reformation system of FIGS. 2A and 2B;

FIG. 6A is side, cross-sectional view of another embodiment of a mixer/vaporizer system of the fuel reformation system of FIGS. 2A and 2B;

FIG. 6B is an enlarged view of the indicated area of detail shown in FIG. 5A;

FIG. 7 is side view of a high speed, air-breathing propulsion system having an engine wall heat exchanger with a foil catalyst in accordance with the principles of this disclosure;

FIG. 8 is a perspective view of the engine wall heat exchanger of FIG. 7 with portions thereof removed to illustrate the foil catalyst of the engine wall heat exchanger;

FIGS. 9A-9C are progressive views illustrating a manufacturing technique for a foil catalyst of the engine wall heat exchanger of FIGS. 7 and 8;

DETAILED DESCRIPTION

Figure 1:
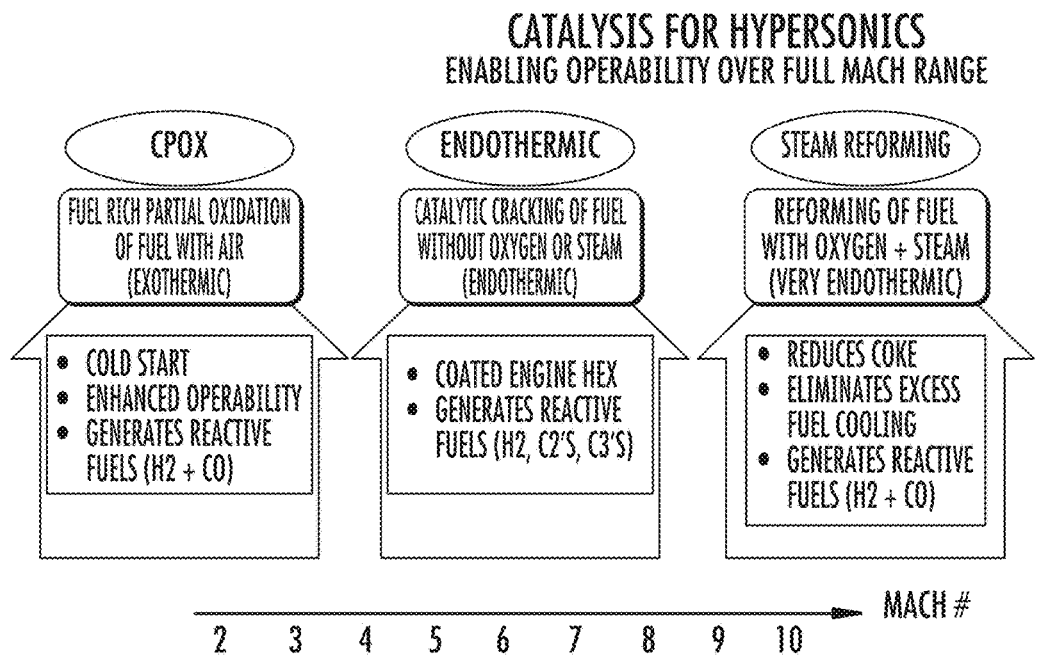
FIG. 1 is a chart illustrating a range of applications and relevant Mach numbers for catalytic treatments to improve operability of high speed, air-breathing propulsion systems.

The disclosed embodiments are described in detail with reference to the drawings, in which like reference numerals designate identical or corresponding elements in each of the several views. In addition, directional terms such as upper, lower, front, rear, top, bottom, up, down, right, left, and the like are used simply for convenience of description and are not intended to limit this disclosure. In the following description, well-known functions or constructions are not described in detail to avoid obscuring the disclosure in unnecessary detail.

As seen in FIG. 1, there are multiple applications for high speed, air-breathing propulsion systems that operate over a range of Mach numbers (e.g., high-supersonic through hypersonic). More particularly, CPOX technology can provide fuel rich partial oxidation of fuel with air over low Mach numbers (e.g., Mach range up to about 4). Such catalysis can generate reactive fuels ($H_2$+CO) that be used for cold start (exothermic) and provide enhanced operability. In mid to high Mach numbers (e.g., ranging between about Mach 5 and about Mach 8), endothermic catalysis provides catalytic cracking of fuel without oxygen or steam. Such catalysis generates reactive fuels ($H_2$, $C_2$'s, $C_3$'s) that can be used for a coated engine heat exchanger. In high Mach numbers (e.g., above about Mach 8), steam reforming catalysis (very endothermic) provides reforming of fuel with oxygen and steam. Such catalysis generates reactive fuels ($H_2$+CO), reduces coke formation, and eliminates excess fuel cooling.

Logistical implementation of a fuel reformation system depends on the support infrastructure and packaging of the system for a specific vehicle type. Two broad vehicle categories for application are expendable systems and reusable systems. Fuel reformation can be applied to each of these systems, for instance, with different objectives, support systems available, and/or packaging requirements. It is contemplated that any suitable design options can be provided with a detailed characterization of the capabilities and requirements of the fuel reformation systems to account for behavior changes at different operating conditions, and which are subject to different pre-conditioning of a fuel processing reactor system and supplied fuel and oxidizer(s).

According to aspects of this disclosure, fuel reformation systems are configured to act as an exothermic cold start for low Mach numbers and/or an endothermic enhanced cooling system for mid to high Mach numbers. In some embodiments, the fuel reformation systems may provide a single catalytically treated flow surface that supports operability over a full Mach number range as shown in FIG. 1.

Figure 2A:
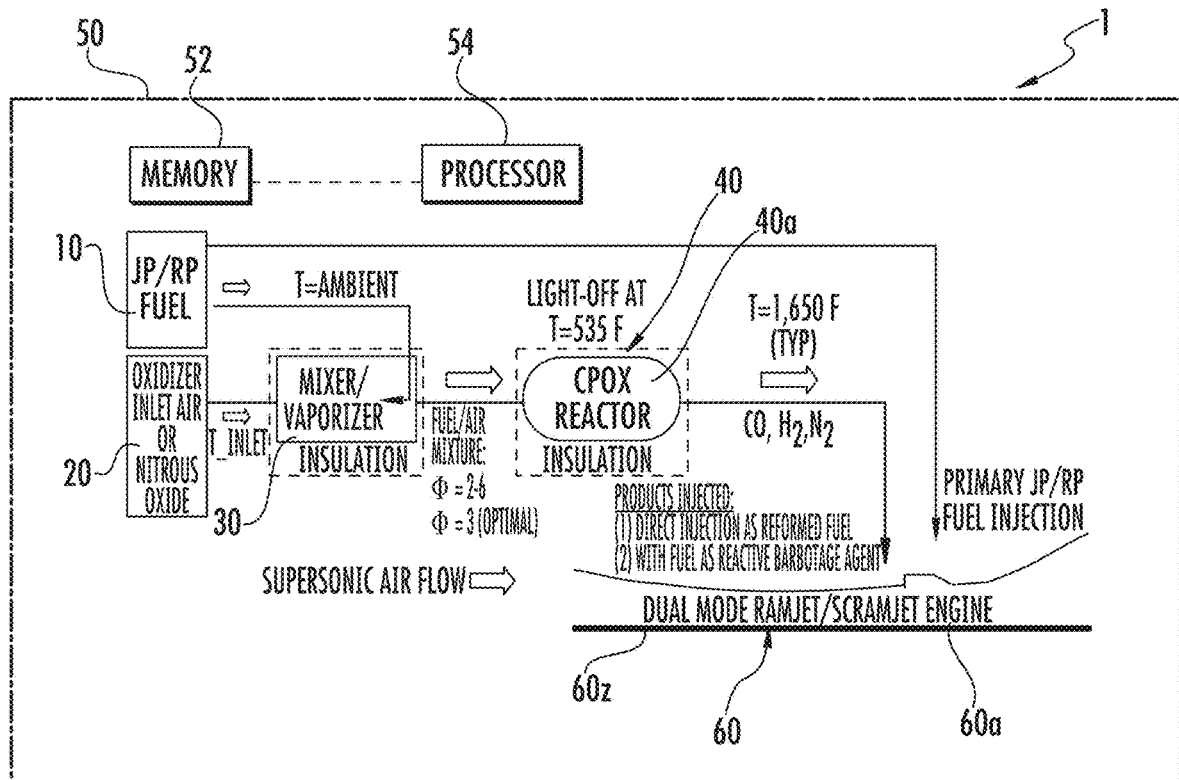
FIG. 2A is a schematic view of one embodiment of a fuel reformation system in accordance with the principles of this disclosure.
Figure 2B:
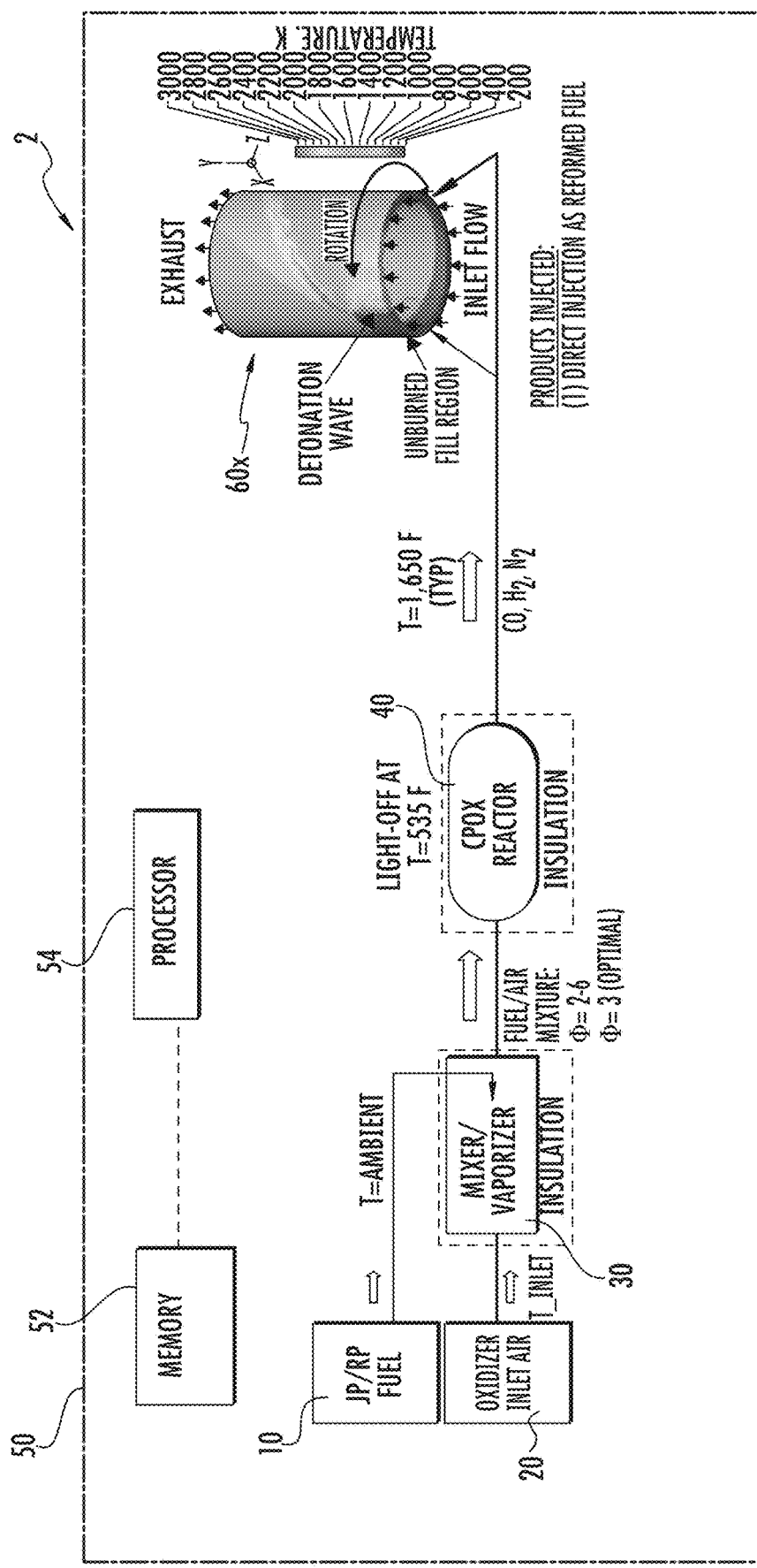
FIG. 2B is schematic view of another embodiment of a fuel reformation system in accordance with the principles of this disclosure.

Referring to FIGS. 2A and 2B, fuel reformation systems 1, 2 are configured to act as an exothermic cold start for low Mach numbers. Cold start or ignition and combustion of a high speed, air-breathing propulsion systems 60, such as a scramjet operating as dual mode ramjet or dual mode scramjet, is challenging because (1) the fuel is typically a liquid (high ignition delay times); (2) the stagnation conditions (pressure and temperature) are typically not conducive to auto-igniting the liquid fuel or creating conditions favorable for combustion in the combustor, particularly during ram/dual mode operation; and (3) the engine structure is typically cold. By reforming the fuel with CPOX and air or another oxidizer in a fuel rich condition (e.g., 3 times stoichiometry), syngas can be generated and more reactive species can be delivered to the engine at conditions that typically make liquid fuel combustion challenging.

The fuel reformation systems 1, 2 include a fuel delivery system 10 (e.g., jet fuel such as JP-7 or JP-8), an oxidizer delivery system 20 (e.g., off-board air), an insulated mixer/vaporizer system 30, an insulated fuel processing reactor system 40, which includes a CPOX reactor 40a, and a controller 50. The fuel reformation system can be coupled to, or integrally formed with, a high speed propulsion system such as a dual mode ramjet or scramjet engine 60z or a rotation detonating device 60x. The fuel reformation systems can be configured to deliver a fuel-air ratio, gas hourly space velocity (i.e., residence time) and catalyst formulation that can enable the hot syngas to include more reactive species (e.g., hydrogen) or radicals for better performance during cold start of high speed, air-breathing, propulsion system 60.

The controller 50 may include a processor 54 in electrical communication with memory 52. The memory 52 may have instructions stored thereon, which when executed by the processor 54, cause the fuel reformation systems to inject the hot syngas into the high speed, air-breathing propulsion system 60. The controller 50 may also control reactants (e.g., variations of fuel, oxidizer and water) injected into the high speed, air-breathing propulsion system 60, reactor pressure, and/or residence time to dynamically vary the fuel processing reactor system 40 operation.

In the fuel reformation systems 1, 2, fuel processing reactor system 40 is supplied by cold liquid fuel and air at fuel rich conditions, typically outside of the normal flammability limits, which is passed over a catalytically treated surfaces of catalytic elements in CPOX reactor 40a of fuel processing reactor system 40, so that a hot gas effluent (hot syngas) is produced that is composed primarily of nitrogen, carbon monoxide, and hydrogen. The hot syngas is configured to promote accelerated heat release and aid in reducing reaction time of the high speed, air-breathing propulsion system. The fuel reformation system 1 is configured to inject the hot gas effluent upstream of a flame-holding cavity 60a of the high speed, air-breathing propulsion system 60 to achieve mixing and enhanced reaction in the cavity 60a when the hot gas effluent is entrained in the cavity 60a, where the high speed, air-breathing propulsion system 60 will be spark ignited and stabilized in the presence of the hot gas effluent. In the case of fuel barbotage, the hot syngas (e.g., CPOX effluent) can be mixed with cold fuel (e.g., JP/RP Fuel) to deliver a mixed gas and liquid fuel effluent that results in a hot and highly atomized fuel stream to the combustor (e.g., engine) of the high speed, air-breathing propulsion system 60.

Figure 3A:
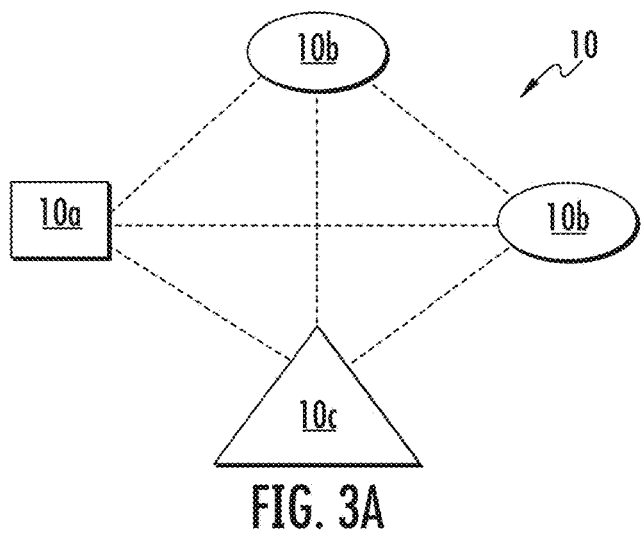
FIG. 3A is a schematic view of a fuel delivery system of the fuel reformation system of FIGS. 2A and 2B.

As seen in FIG. 3A, fuel delivery system 10 includes any suitable mechanical and/or electromechanical components such as a flow metering pump 10a, fuel tanks 10b supporting jet fuel "F" (see FIG. 3C) such as JP-7 or JP-8 (e.g., at ambient temperature), and associated control electronics 10c that are coupled to pump 10a and tanks 10b, etc. Control electronics 10c are disposed in electrical communication with controller 50 for selectively dispensing the jet fuel into the fuel reformation system, for example, by delivering the jet fuel "F" to mixer/vaporizer 30 for mixing with, for instance, the oxidizer "O" (see FIG. 3C) delivered from oxidizer delivery system 20. Alternatively, or additionally, fuel delivery system 10 may deliver the jet fuel "F" directly to the high speed, air breathing propulsion system 60.

Figure 3B:
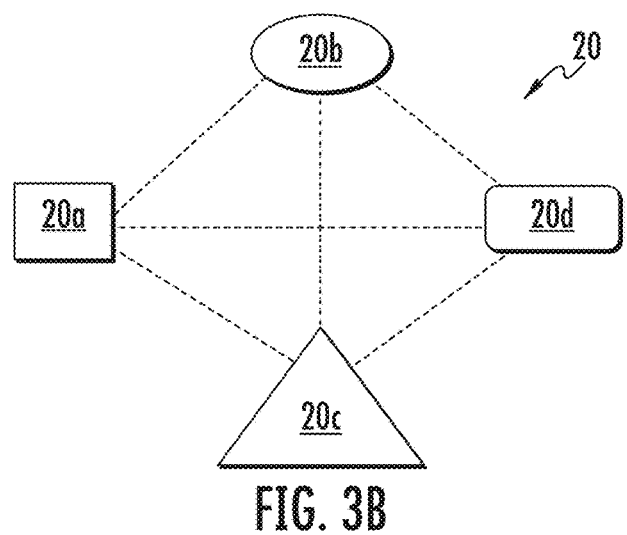
FIG. 3B is a schematic view of an oxidizer delivery system of the fuel reformation systems of FIGS. 2A and 2B.

With reference to FIG. 3B, oxidizer delivery system 20 is configured to support and/or deliver an oxidizer "O", such as off-board air, to mixer/vaporizer system 30 and/or high speed, air breathing propulsion system 60. Oxidizer delivery system 20 may include any suitable mechanical and/or electromechanical components such as a mass flow controller 20a, regulators 20b, solenoid valves 20c, etc. In some embodiments, oxidizer delivery system 20 may include a heater and/or cooler 20d that is configured to heat and/or cool the oxidizer. The oxidizer delivery system 20 can be configured to deliver, the oxidizer "O" to mixer/vaporizer system 30 for mixing with the jet fuel "F." The oxidizer delivery system 20 is configured to deliver the oxidizer "O" (e.g., air) to the mixer/vaporizer system 30 at temperatures as low as 530 degrees and upwards of about 750 degrees Fahrenheit. Example oxidizers include air that is captured by the inlet or a separate induction system (e.g., off-board) or can include an onboard oxidizer such as nitrous oxide that can be decomposed using its own catalytic reactor (not shown). In most cases, the oxidizer will be at elevated temperatures due to deceleration of the high speed flow or decomposition of on onboard oxidizer.

Figure 3C:
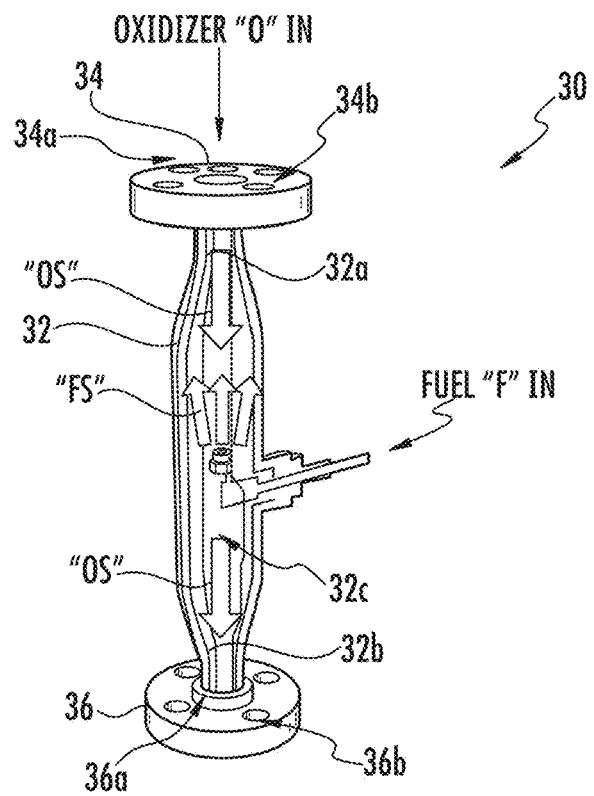
FIG. 3C is a perspective view of a mixer/vaporizer system of the fuel reformation system of FIGS. 2A and 2B.

As seen in FIG. 3C, mixer/vaporizer system 30, which is insulated to retain heat, includes an elongated body or tube 32 (e.g., a vaporizer tube) supporting an upper plate 34 and a lower plate 36. Elongated body 32 has tapered upper and lower end portions 32a, 32b and defines a chamber 32c to facilitate mixing and vaporizing of the oxidizer "O" and jet fuel "F" injected into chamber 32c. Upper plate 34 defines an ingress aperture 34a that is disposed in fluid communication with oxidizer delivery system 20 (e.g., via fluid conduit or tube). Lower plate 36 defines an egress aperture 36a that is disposed in fluid communication with the CPOX reactor 40a of fuel processing reactor system 40 (e.g., via a fluid conduit or tube). Upper and lower plates 34, 36 may also define mounting apertures 34b, 36b to enable mixer/vaporizer system 30 to be mounted in a vertical orientation (e.g., via fasteners such as screws) for instance, to prevent fuel from puddling. Mixer/vaporizer system 30 further includes a fuel injection port 38 having a nozzle 38a, which may be a hollow-cone nozzle, that is positioned in counterflow to an oxidizer stream "OS" to inject jet fuel "F" along a fluid stream "FS" that is disposed in a vertical direction opposite to the oxidizer stream "OS." Mixer/vaporizer system 30 is configured to output a first effluent (e.g., fuel/air mixture) in a fuel-air equivalence ratio "Φ" in range as low as about 2 to about as high as 6 for delivery to CPOX reactor 40a.

Figure 3D:
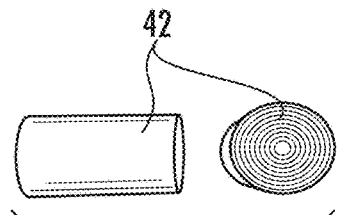
FIG. 3D illustrates foil catalysts of a fuel processing reactor system of the fuel reformation system of FIGS. 2A and 2B.
Figure 3E:
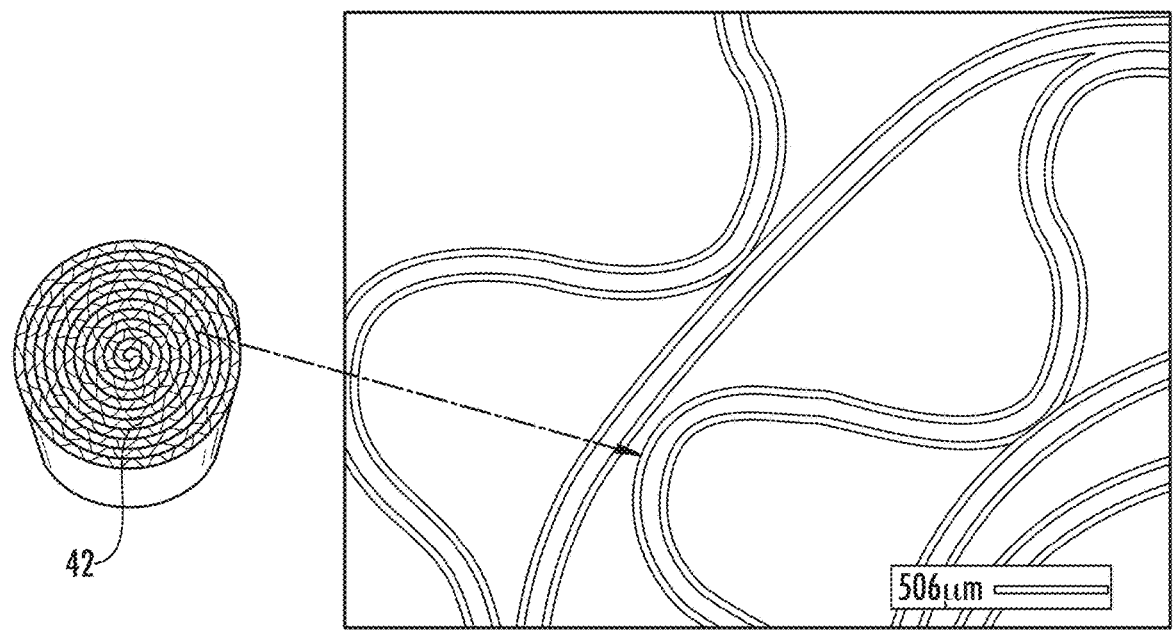
FIG. 3E illustrates the cross-section of foils of the foil catalysts of FIG. 3D.

As seen in FIGS. 3D, 3E, and 4, the CPOX reactor 40a of fuel processing reactor system 40, which may have a low pressure drop configuration, can include any number (e.g., between 2 to 4) of catalyst elements such as foil catalysts or monoliths 42 that are stacked in a reactor tube assembly 44 (e.g., an Inconel tube) and positioned to react (e.g., $C_nH_{2n}$+ $(0.5n)O_2$ to $(n)CO+(n)H_2$; see FIG. 4) with the fuel/air mixture output from the mixer/vaporizer system 30 to generate reactive, fuel-rich synthesis gas (e.g., hot syngas) that can be used for ignition enhancement, cold start, and the preheating of engine structure of high speed, air-breathing propulsion systems 60.

Figure 3F:
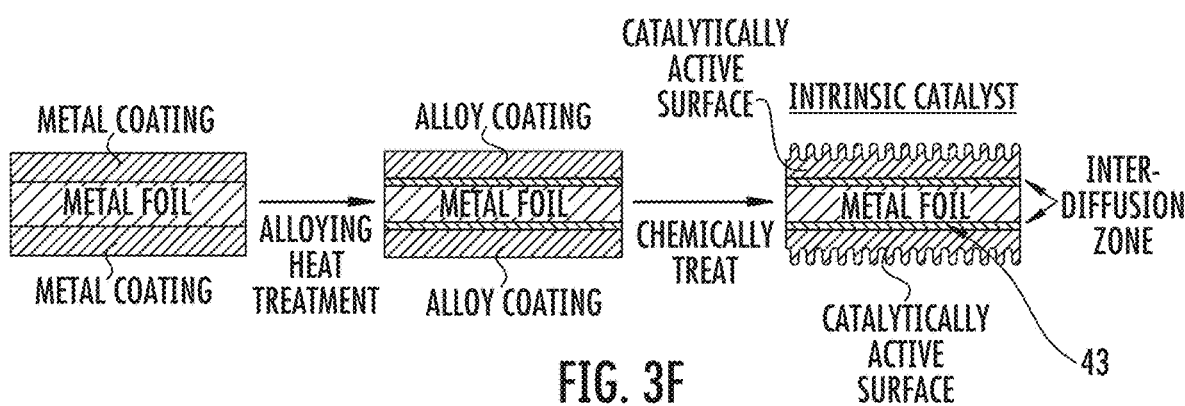
FIG. 3F is a schematic representation of alloy coating technology provided on the foils of the foil catalysts of FIG. 3E.
Figure 3G:
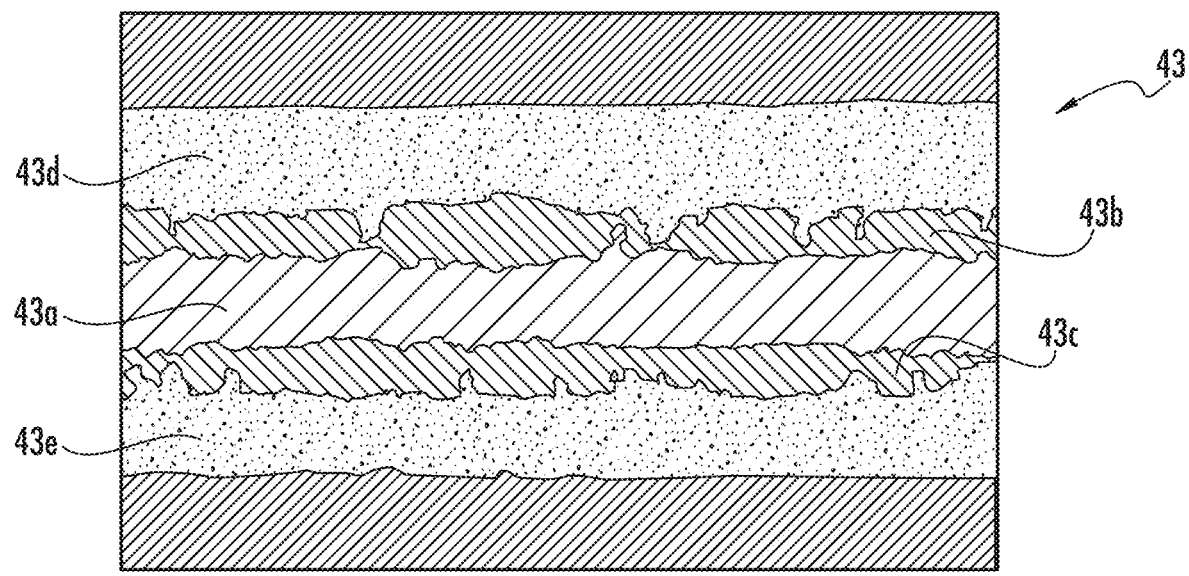
FIG. 3G is an enlarged view (electron) illustrating layers of the foils with the alloy coating technology of FIG. 3F.

With reference to FIGS. 3F and 3G, foil catalysts 42 include foils 43 that can be formed using alloy coating technology. For instance, foil catalysts 42 may be layered and can include a metal substrate layer 43a supported between an upper interdiffusion layer 43b and a lower interdiffusion layer 43c. An upper catalytically active substance layer 43d, which may be nanostructured, is layered on the upper interdiffusion layer 43b, and a lower catalytically active substance layer 43e, which may be nanostructured, is layered on lower interdiffusion layer 43c. In some embodiments, such as where foils 43 have a rounded cross-section, upper and lower interdiffusion layers 43b, 43c may be the same layer, and/or the upper and lower catalytically active substance layers 43d, 43e may be the same layer. The upper and lower interdiffusion layers 43b, 43c are adherent oxide layers interdiffused into the metal substrate layer 43a and have sufficiently high surface area to support metal crystallites (e.g., rhodium, platinum, etc.) as catalyst. The formation of the metal oxide layer on the substrate surface protects the substrate from thermal degradation when used under high temperature severe reaction conditions. And, an oxide surface layer on a metal substrate can be used to reduce coke formation and carburization for high temperature hydrocarbon cracking or reforming. In embodiments, interdiffusion layers 43b, 43c include aluminum oxide. Foil catalysts 42 can be provided in a compact form factor. In embodiments, the foil catalysts 42 may be in the form of monolithic Swiss-roll structures made from metal oxides (e.g., aluminum oxide) that serve as an integrated catalyst carrier (e.g., variants of platinum, rhodium, etc.). In particular, foils 43 of foil catalysts 42 maybe catalytically coated, as seen in FIG. 3F, corrugated, and then rolled (e.g., Swiss Roll) to form the final foil catalyst 42. Foil catalysts 42 are configured to remove oxygen contamination from hydrocarbon gas streams to generate syngas ($CO+H_2$).

Advantageously, the layered configuration of foil catalysts 42 may provide integral bonding of nanostructured catalytic layers, mechanical robustness such that there is no delamination under severe conditions, and in microchannel structures, eliminates any need for a wash-coat layer. Further, such layered configuration also provides high catalytic activity for selected reactions.

Figure 3H:
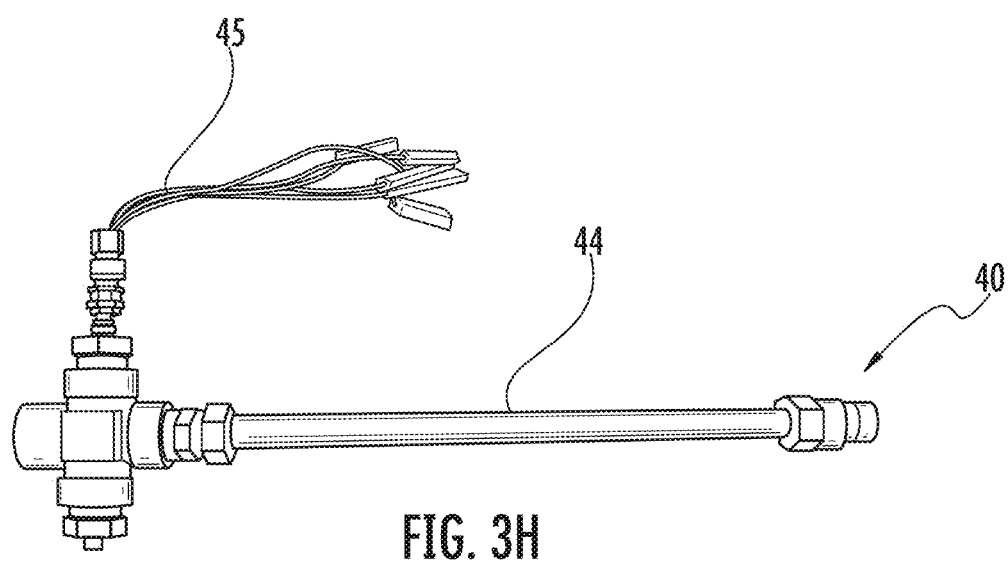
FIG. 3H is a side view of an embodiment of a fuel processing reactor system of the fuel reformation system of FIGS. 2A and 2B.
Figure 3I:
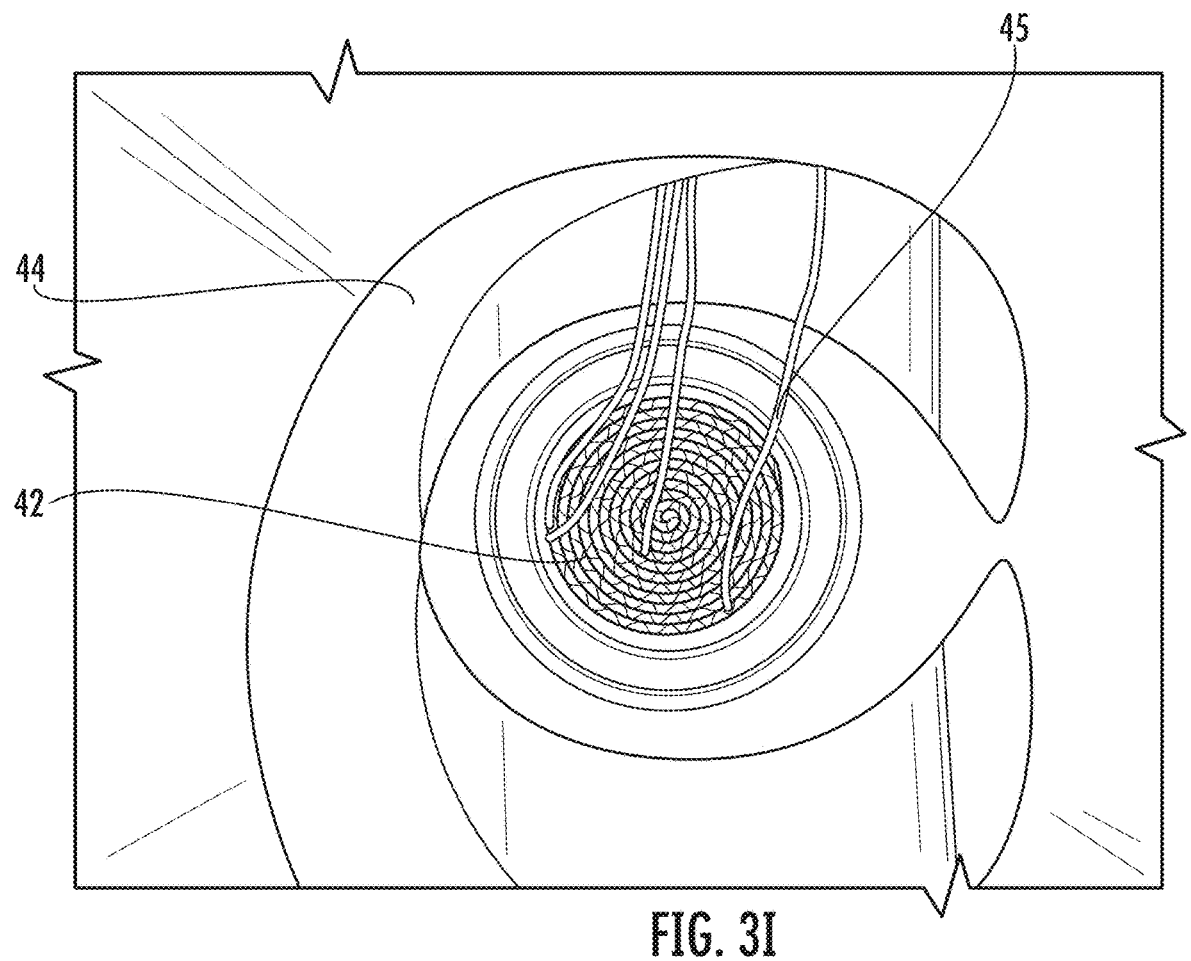
FIG. 3I is an enlarged, downstream view within the fuel processing reactor system of FIG. 3H showing thermocouples attached to a foil catalyst of the fuel processing reactor system.

As seen in FIGS. 3H and 3I, although foil catalysts 42 can have any suitable shape and/or configuration, in embodiments, foil catalysts 42 may be 1-inch diameter by 1.5-inch length, and are configured to be loaded into a 1-inch diameter reactor tube assembly, as illustrated in FIG. 3I. The reactor tube assembly 44 may, in some embodiments, have compact configuration (e.g., a diameter of 1 inch and length of 4 inches). The reactor tube assembly 44 length (e.g., active reactor tube length) may be 3-6 inches long, although the physical length of the tube assembly 44 (e.g., reactor tube) may be longer to accept additional foil catalysts 42 to increase the residence time of the reactants with the catalyst. For instance, based on some typical operating conditions, 0.01 lb/s air and three 1 inch by 1.5 inch foil catalysts 42 and 1 atm pressure, the residence time is 6.5 ms and the GHSV is 550,000 hr−1. The reactor rube assembly 44 may include any suitable fittings on end portions thereof. Further, the foil catalysts 42 can be instrumented with thermocouples 45, for example, one in each foil catalyst 42, in addition to one each before and after the catalyst system.

Catalytic partial oxidation reactors represent a compact and highly responsive solution to the fuel rich reforming of hydrocarbon fuels as given below:

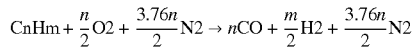

$$CnHm + \frac{n}{2}O2 + \frac{3.76n}{2}N2 \rightarrow nCO + \frac{m}{2}H2 + \frac{3.76n}{2}N2$$

The reforming system produces an effluent mixture whose reactive species are comprised primarily of hydrogen and carbon monoxide gases that are delivered on demand through catalytic partial oxidation (i.e., fuel-rich catalytic combustion). In particular, the reformation system of this disclosure advantageously includes a CPOX reactor 40a that is integrated for on-demand generation of hot syngas to promote accelerated heat release and aid in reducing reaction times while serving to preheat engines of high speed, air-breathing propulsion systems 60. Due to the short residence time, the CPOX reactor 40a enables high fuel throughput and syngas yields in a compact reactor that operates nearly adiabatically. Furthermore, the catalyst enables an alternative route for the reaction to occur at a lower activation energy level. This equates to increased reaction rates at a fixed temperature or equivalently reduced light-off temperature at a given reaction rate.

Although the hot syngas, which is a hot, hydrogen-rich effluent, can be in the range of about 1400 degrees Fahrenheit to about 1900 degrees Fahrenheit, in embodiments, the syngas mixture (e.g., CO, $H_2$, $H_2O$, $CO_2$ . . . , $N_2$) may have a temperature of about 1,650 degrees Fahrenheit for injection into high speed, air-breathing propulsion systems 60 (FIG. 1).

As seen in FIG. 5, the catalyst elements 42 of the CPOX reactor 40a of fuel processing system 40, which may have a tubular configuration for stacking in tube assembly 44 of CPOX reactor 40a as seen in FIG. 3H, include precious metals (e.g., platinum, rhodium) for effectuating catalytic partial oxidation, cause the fuel/air mixture to break or decompose into various elements such as nitrogen, hydrogen and carbon monoxide for output as a hot gas effluent (syngas). The catalyst elements 42 may include any suitable precious metal or material known to have catalytic properties to cause the partial oxidation of hydrocarbon fuels or materials (e.g., variants of rhodium, platinum, etc.), or sources of metal or material used in hydrocarbon cracking processes. As seen in FIGS. 2A and 2B, the fuel processing reactor system 40 including the CPOX reactor 40a may be insulated to increase the catalytic reaction rate of breaking or decomposing the fuel/air mixture after flowing passed the catalytic elements 42.

The fuel reformation systems 1, 2 are designed to achieve enhanced operability of high speed, air-breathing propulsion systems including ignition and cold start by altering the reactivity of the parent liquid fuel. Indeed, fuel reformation utilizing the fuel reformation systems 1, 2 of this disclosure significantly improves combustion kinetics. In particular, FIG. 5 illustrates that fuel reformation systems 1, 2 typically provide 20 percent CO and 18 percent $H_2$ production, as well as ignition delay reduction of more than 10× based on a model utilizing JP-8 fuel.

Illustrated in FIGS. 6A and 6B is another embodiment of a mixer/vaporizer system 100 that is configured to utilize hypodermic tube injection and air blast with, for example, a nominal 300 ft/s air approach velocity. In particular, similar to mixer/vaporizer system 30, mixer/vaporizer 100 receives injected cold fuel from fuel delivery system 10 and an oxidizer (e.g., off-board air) that are mixed and vaporized. For instance, supply air from the oxidizer delivery system 20 is admitted to an elongated tube 102 (e.g., a vaporizer tube) of mixer/vaporizer system 100 configured to facilitate mixing and vaporizing of the oxidizer "O" and jet fuel. In some embodiments elongated tube 102 may have a 0.5-inch diameter. With the oxidizer temperature delivered to the mixer/vaporizer 30 as high temperatures (e.g., at least 530 degrees Fahrenheit), injected jet fuel can be fully vaporized and will achieve robust catalytic reactor light off. Fuel is injected via hypodermic injectors 104 (e.g., four, having a diameter of 0.0625-inch) of mixer/vaporizer system 100 that are partially inserted into the elongated tube 102 at an angle relative to the elongated tube 102 and positioned in circumferentially spaced positions about the elongated tube 102. Injectors 104 extend to beveled tips 104a configured to shear the fuel stream for atomization by the approaching oxidizer "O" (e.g., air). The elongated tube 102 can have ample vaporizer length of 20L/D, for example, to enable the fuel to mix and vaporize before entering the CPOX reactor 40a.

Illustrated in FIGS. 7 and 8 is a high speed, air-breathing propulsion system 200 including a fuel reformation system 3 having an engine wall heat exchanger 202 with a foil catalyst 204 supported therein between an inner wall 202a and an outer wall 202b of engine wall heat exchanger 202. Foil catalyst 204 includes the alloy coating technology detailed above with respect to foil catalysts 42. In particular, foil catalyst 204 is layered and includes a metal substrate layer 43a encompassed by interdiffusion layers 43b, 43c and catalytically active substance layers 43d, 43e as illustrated in FIG. 3G. Foil catalyst 204 may have an annular configuration and may be corrugated. Foil catalyst 204 defines an array of channels or apertures 204a there through.

As seen in FIGS. 9A-9C, to manufacture foil catalyst 204 in the form of a foil baffle insert, for example, a metal substrate is coated, heat treated, and chemically treated to create a layered, catalyst coated sheet 206a (FIG. 9A) such that the layered, catalyst coated sheet 206a includes the catalytically active and interdiffusion layers as illustrated in FIG. 3G. The layered, catalyst coated sheet 206a enables post fabrication of heat exchange structure with a resultant bond that does not spall, crack, or sinter, and is more robust than a typical washcoat technique. With reference to FIG. 9B, the layered, catalyst coated sheet 206a is then punched to define a plurality of arrays of apertures 204a therethrough (e.g., perforated) that are spaced apart by fold lines 208 so that the plurality of arrays of apertures 204a can be folded into a corrugated configuration as seen in FIG. 9C.

In a reusable system with an onboard turbine engine for low speed operations, such as the engine wall heat exchanger 202, the foil catalyst 204 of the engine wall heat exchanger 202 provides high tortuosity flow path with enhanced reactivity. When the foil catalyst 204 is supplied with a fuel rich air mixture (e.g., pressurized; bleed air pre-mixed with fuel) during or prior to cold start, the foil catalyst 204 will cause an exothermic CPOX reaction that pre-heats the engine 260 of high speed, air-breathing propulsion system 200 rapidly (e.g., to CPOX temperature such as 1,600 degrees Fahrenheit) to deliver a gaseous, reactive fuel for rapid auto ignition that supports low Mach cold start of the engine during mode transition. As illustrated in FIG. 6, mode transition occurs when inlet and outlet doors 260a, 260b oft engine 260 move between closed and open positions, as indicated by arrows "O/C." As the engine temperature subsequently increases (e.g., as vehicle accelerates), the amount of air (e.g., from turbine bypass bleed, inlet bleed, and/or directly from the turbine "T") from the turbine "T" would be reduced, until only fuel was flowing through the engine wall heat exchanger 202 (e.g., purely fuel cooled or endothermically cooled). At higher Mach numbers, the engine wall heat exchanger 202, namely the foil catalyst 204 thereof, would serve to endothermically crack the parent fuel and increase its cooling capacity. Thus, the engine wall heat exchanger 202 is configured to provide engine pre-heating and fuel conditioning. Advantageously, the engine wall heat exchanger 202 is configured to switch from a fuel rich air mixture to neat fuel without coking the engine wall heat exchanger 202. Further advantageously, the engine wall heat exchanger 202 serves as both an ignition/cold-start system and a preheater for neat-fuel vaporization.

Figure 10:
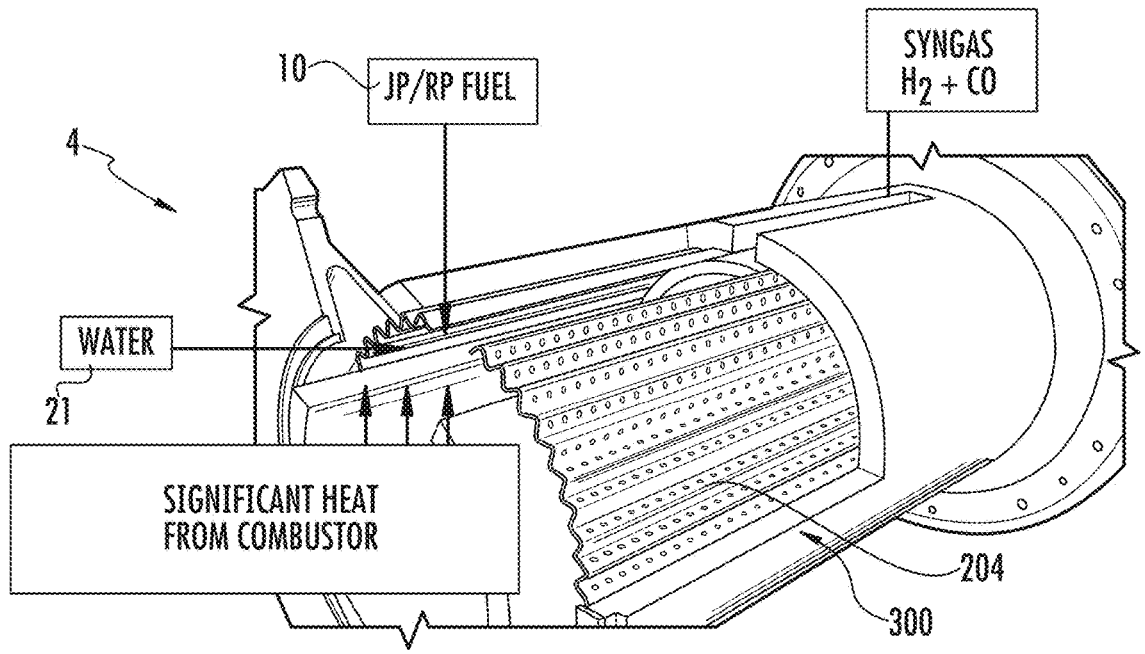
FIG. 10 is a perspective view of another embodiment of a fuel reformation system including a steam reforming reactor embodied in an engine wall heat exchanger.

In some embodiments, as illustrated in FIG. 10, a fuel reformation system 4, similar to fuel reformation system 3, can include a CPOX reactor that acts a steam reforming reactor 300. In this embodiment, the steam reforming reactor 300 is illustrated in the form of an engine wall or combustor heat exchanger with a foil catalyst 204 between the inner and outer walls thereof. Air in the reactor is replaced with water (e.g., a water delivery system 21) so that the reaction becomes a steam reforming reactor which is highly endothermic and can be leveraged for further cooling of the dual mode ramjet or scramjet engine, for example. The steam reforming reaction delivers significantly more hydrogen as an effluent (e.g., syngas with extra hydrogen), but requires heat to become self-sustaining. Steam reforming is not sustaining without heat input since it is highly exothermic.

Figure 11:
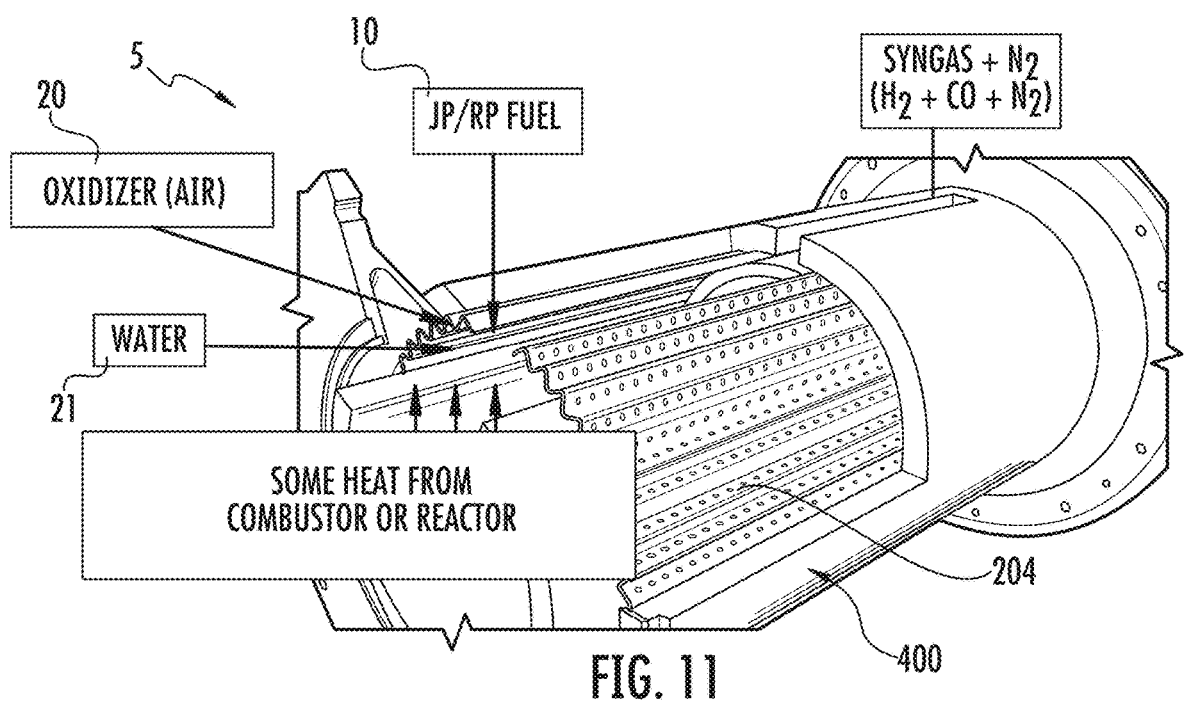
FIG. 11 is a perspective view of yet another embodiment of a fuel reformation system including auto thermal reactor embodied in an engine wall heat exchanger.

In some embodiments, as Illustrated in FIG. 11, fuel reformation system 5, similar to reformation systems 3 and 1, includes a CPOX reactor with the addition of water so that the CPOX reactor becomes an auto thermal reformer 400 where both CPOX and steam reforming co-exist within the same reactor 400. This embodiment has the advantage of delivering more hydrogen as a reactive effluent while also being less exothermic. Although shown integral to a combustor heat exchanger, fuel reformation system 5 can also be externally applied since it is like CPOX and is self-sustaining.

Indeed, as applied to high speed, air-breathing propulsion systems, the fuel reformation systems of this disclosure provide at least the following advantages:

A) the ability to reform liquid fuel on-demand to generate hot (—up to 1900° F.) hydrogen-rich effluent that may (i) aid in ignition, (ii) enhance the reaction rate and (iii) accelerate the heat release of "slow" liquid fuel combustion;

B) rapid, self-sustaining light-off at low temperatures (typically 530° F.) for most hydrocarbon fuels;

C) light-off temperatures that can be easily obtained from high temperature on-board bleed air or, for example, a simple glow-plug arrangement;

D) low pressure drop due to the use of a high open area structures that are catalytically coated and do not suffer from mass transfer limitations; these configurations lead to exceptionally high heat and mass transfer properties with high active surface area;

E) use of syngas (CPOX effluent) as an on-demand barbotage gas alternative;

F) compact reactor embodiments that include: (i) a simple reactor housing including a tube with a mixing/vaporization section and catalytic section contained with standard fittings or (ii) folded and formed catalytic elements that can be inserted into a combustor heat exchanger (HEX) annulus;

G) reformed output stream that represents a small percentage of overall fuel delivery with minimal impact on overall efficiency of the high speed, air-breathing propulsion system (e.g., the power plant);

H) reforming of aviation fuels into hydrogen and other small molecules that help create a fuel that burns very efficiently and over a broader range of operating conditions;

I) during propulsion mode transition, partial oxidation of the entire engine fuel stream can be performed with a catalytically coated combustor HEX thereby generating fuel with a wider stability envelope at lower Mach/q levels while simultaneously pre-heating the "cold" engine structure; and J) reformate of this disclosure can aid in eliminating exhaust emissions of hydrocarbons and particulate matter which may generate undesirable thermal or particulate-based signatures.

As used herein, the term "controller" and like terms are used to indicate a device that controls the transfer of data from a computer to a peripheral or separate device and vice versa, and/or a mechanical and/or electromechanical device (e.g., a lever, knob, etc.) that mechanically operates and/or actuates a peripheral or separate device. The term "controller" also includes "processor," "digital processing device" and like terms, and are used to indicate a microprocessor or central processing unit (CPU). The CPU is the electronic circuitry within a computer that carries out the instructions of a computer program by performing the basic arithmetic, logical, control and input/output (I/O) operations specified by the instructions, and by way of non-limiting examples, include server computers and vehicles. In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. In some embodiments, the operating system is provided by cloud computing.

In some embodiments, the controller includes a storage and/or memory device 52. The storage and/or memory device is one or more physical apparatus used to store data or programs on a temporary or permanent basis. In some embodiments, the controller includes volatile memory and requires power to maintain stored information. In some embodiments, the controller includes non-volatile memory and retains stored information when it is not powered. In some embodiments, the non-volatile memory includes flash memory. In some embodiments, the non-volatile memory includes dynamic random-access memory (DRAM). In some embodiments, the non-volatile memory includes ferroelectric random access memory (FRAM). In some embodiments, the non-volatile memory includes phase-change random access memory (PRAM). In some embodiments, the controller is a storage device including, by way of non-limiting examples, CD-ROMs, DVDs, flash memory devices, magnetic disk drives, magnetic tapes drives, optical disk drives, and cloud computing based storage. In some embodiments, the storage and/or memory device is a combination of devices such as those disclosed herein.

In some embodiments, the controller includes a display to send visual information to a user such as a pilot. In some embodiments, the display is a cathode ray tube (CRT). In some embodiments, the display is a liquid crystal display (LCD). In some embodiments, the display is a thin film transistor liquid crystal display (TFT-LCD). In some embodiments, the display is an organic light emitting diode (OLED) display. In various some embodiments, on OLED display is a passive-matrix OLED (PMOLED) or active-matrix OLED (AMOLED) display. In some embodiments, the display is a plasma display. In some embodiments, the display is a video projector. In some embodiments, the display is interactive (e.g., having a touch screen or a sensor such as a camera, a 3D sensor, a LiDAR, a radar, etc.) that can detect user interactions/gestures/responses and the like. In still some embodiments, the display is a combination of devices such as those disclosed herein.

As can be appreciated, the controller may include or be coupled to a server and/or a network. As used herein, the term "server" includes "computer server," "central server," "main server," and like terms to indicate a computer or device on a network that manages the vehicle, vehicle components, and/or vehicle resources. As used herein, the term "network" can include any network technology including, for instance, a cellular data network, a wired network, a fiber optic network, a satellite network, and/or an IEEE 802.11a/b/g/n/ac wireless network, among others.

In some embodiments, the controller can be coupled to a mesh network. As used herein, a "mesh network" is a network topology in which each node relays data for the network. All mesh nodes cooperate in the distribution of data in the network. It can be applied to both wired and wireless networks. Wireless mesh networks can be considered a type of "Wireless ad hoc" network. Thus, wireless mesh networks are closely related to Mobile ad hoc networks (MANETs).

Although MANETs are not restricted to a specific mesh network topology, Wireless ad hoc networks or MANETs can take any form of network topology. Mesh networks can relay messages using either a flooding technique or a routing technique. With routing, the message is propagated along a path by hopping from node to node until it reaches its destination. To ensure that all its paths are available, the network must allow for continuous connections and must reconfigure itself around broken paths, using self-healing algorithms such as Shortest Path Bridging. Self-healing allows a routing-based network to operate when a node breaks down or when a connection becomes unreliable. As a result, the network is typically quite reliable, as there is often more than one path between a source and a destination in the network. This concept can also apply to wired networks and to software interaction. A mesh network whose nodes are all connected to each other is a fully connected network.

In embodiments, the controller may include one or more modules. As used herein, the term "module" and like terms are used to indicate a self-contained hardware component of the central server, which in turn includes software modules. In software, a module is a part of a program. Programs are composed of one or more independently developed modules that are not combined until the program is linked. A single module can contain one or several routines, or sections of programs that perform a particular task.

As used herein, the controller includes software modules for managing various aspects and functions of the vehicles. As used herein, the term "vehicle" and like terms are used to indicate manned and unmanned aircraft, aerial drones, hovercraft, and spacecraft.

The systems described herein may also utilize one or more controllers to receive various information and transform the received information to generate an output. The controller may include any type of computing device, computational circuit, or any type of processor or processing circuit capable of executing a series of instructions that are stored in memory 52. The controller may include multiple processors and/or multicore central processing units (CPUs) and may include any type of processor, such as a microprocessor, digital signal processor, microcontroller, programmable logic device (PLD), field programmable gate array (FPGA), or the like. The controller may also include a memory to store data and/or instructions that, when executed by the one or more processors, cause the one or more processors to perform one or more methods and/or algorithms.

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

Persons skilled in the art will understand that the structures and methods specifically described herein and illustrated in the accompanying figures are non-limiting exemplary embodiments, and that the description, disclosure, and figures should be construed merely as exemplary of particular embodiments. It is to be understood, therefore, that this disclosure is not limited to the precise embodiments described, and that various other changes and modifications may be effected by one skilled in the art without departing from the scope or spirit of this disclosure. Additionally, it is envisioned that the elements and features illustrated or described in connection with one exemplary embodiment may be combined with the elements and features of another without departing from the scope of this disclosure, and that such modifications and variations are also intended to be included within the scope of this disclosure. Indeed, any combination of any of the disclosed elements and features is within the scope of this disclosure. Accordingly, the subject matter of this disclosure is not to be limited by what has been particularly shown and described.

The invention claimed is:

1. A fuel reformation system, comprising:
a fuel delivery system configured to support fuel;
an oxidizer delivery system configured to support an oxidizer;
a mixer/vaporizer system in fluid communication with the fuel delivery system and the oxidizer delivery system, the mixer/vaporizer system configured to receive the oxidizer from the oxidizer delivery system and the fuel from the fuel delivery system to mix and vaporize the oxidizer and fuel into a first effluent; and
a fuel processing reactor system configured to receive the first effluent and react with the first effluent to generate a second effluent in the form of hot syngas for selective injection into a high speed, air-breathing propulsion system, the fuel processing reactor system configured to pre-heat and vaporize the fuel to enhance atomization and combustion into the high speed, air-breathing propulsion system.

2. The fuel reformation system of claim 1, wherein the fuel processing reactor system includes a catalytic partial oxidation reactor to receive the fuel and oxidizer to deliver the hot syngas for selective injection into the high speed air-breathing propulsion system.

3. The fuel reformation system of claim 2, wherein the catalytic partial oxidation reactor is configured to deliver the hot syngas directly to the high speed, air-breathing propulsion system to aid the combustion of a primary liquid fuel injected into the high speed, air-breathing propulsion system through a separate stream, a barbotaged injection scheme, or combinations thereof.

4. The fuel reformation system of claim 2, further comprising the high speed, air-breathing propulsion system, wherein the hot syngas is configured to preheat the high speed, air-breathing propulsion system when injected into the high speed, air-breathing propulsion system.

5. The fuel reformation system of claim 4, wherein the high speed, air-breathing propulsion system is a dual mode ramjet, a scramjet, or a rotating detonation engine.

6. The fuel reformation system of claim 5, wherein the fuel processing reactor system is insulated.

7. The fuel reformation system of claim 6, wherein the mixer/vaporizer is insulated.

8. The fuel reformation system of claim 1, wherein the oxidizer is off-board air, onboard oxidizer, or combinations thereof.

9. The fuel reformation system of claim 1, wherein the fuel processing reactor system includes a steam reformer reactor configured to receive the fuel and water within a heat exchanger of the high speed, air-breathing propulsion system, the steam reformer reactor configured to simultaneously cool combustor walls of the high speed, air-breathing propulsion system and deliver the hot syngas for selective injection into the high speed, air-breathing propulsion system.

10. The fuel reformation system of claim 9, wherein the steam reformer reactor is configured to deliver the hot syngas directly to the high speed, air-breathing propulsion system to aid the combustion of a primary liquid fuel injected into the high speed, air-breathing propulsion system through a separate stream, a barbotaged injection scheme, or combinations thereof.

11. The fuel reformation system of claim 1, wherein the fuel processing reactor system includes an autothermal reformer configured to receive the fuel and water within a catalytic reactor of the high speed, air-breathing propulsion system, the autothermal reforming reactor configured to deliver the hot syngas for selective injection into the high speed, air-breathing propulsion system.

12. The fuel reformation system of claim 1, wherein the fuel processing reactor system is configured to deliver the hot syngas directly to the high speed, air-breathing propulsion system to aid the combustion of a primary liquid fuel injected into the high speed, air-breathing propulsion system through a separate stream, a barbotaged injection scheme, or combinations thereof.

13. The fuel reformation system of claim 1, wherein the first effluent has a fuel-air equivalence ratio between about 2 and about 6.

14. The fuel reformation system of claim 1, wherein the fuel processing reactor system includes a reactor that supports a foil catalyst including a metal substrate layer, an interdiffusion layer, and a catalytically active substance layer.

15. The fuel reformation system of claim 1, wherein the fuel processing reactor system includes a reactor tube assembly having a diameter as small as one inch.

16. The fuel reformation system of claim 1, wherein the fuel processing reactor system is configured to provide a residence time less than 1 second.

17. The fuel reformation system of claim 16, wherein the fuel processing reactor system is configured to provide a residence time less than 10 ms.

18. The fuel reformation system of claim 1, wherein the mixer/vaporizer system supports hypodermic injectors for delivering the fuel into a vaporizer tube of the mixer/vaporizer system.

19. The fuel reformation system of claim 18, wherein the hypodermic injectors include beveled tips configured to shear a fuel stream of the fuel for atomization by the oxidizer.

20. The fuel reformation system of claim 1, further comprising a controller, the controller including a processor in electrical communication with memory, the memory having instructions stored thereon, which when executed by the processor, cause the fuel reformation system to inject the hot syngas into the high speed, air-breathing propulsion system.

21. A method for heating a high speed, air-breathing propulsion system, the method comprising:
    delivering jet fuel and an oxidizer to a mixer/vaporizer to generate a first effluent;
    delivering the first effluent to a fuel processing reactor system to generate a second effluent in the form of a hot syngas;
    pre-heating the jet fuel to enhance atomization and combustion into the high speed, air breathing propulsion system; and
    selectively injecting the hot syngas into the high speed, air-breathing propulsion system.

22. The method of claim 21, further comprising passing reactants over a catalyst in a reactor of the fuel processing reactor system, the catalyst including a metal substrate layer, an interdiffusion layer, and a catalytically active substance layer.

23. A combustor heat exchanger for a high speed, air-breathing propulsion system, comprising:
    a metal substrate layer coated with catalyst and defining fuel cooled channels, the catalyst including an interdiffusion layer and a catalytically active layer that are configured to cause an exothermic catalytic partial oxidation reaction when the high speed, air-breathing propulsion system is traveling at a first set of Mach numbers and an endothermic reaction when the high speed, air-breathing propulsion system is traveling at a second set of Mach numbers that are higher than the first set of Mach numbers.

24. A fuel reformation system, comprising:
    a fuel delivery system configured to support fuel;
    an oxidizer delivery system configured to support an oxidizer;
    a mixer/vaporizer system in fluid communication with the fuel delivery system and the oxidizer delivery system, the mixer/vaporizer system configured to receive the oxidizer from the oxidizer delivery system and the fuel from the fuel delivery system to mix and vaporize the oxidizer and fuel into a first effluent; and
    a fuel processing reactor system configured to receive the first effluent and react with the first effluent to generate a second effluent in the form of hot syngas for selective injection into a high speed, air-breathing propulsion system, the hot syngas configured to preheat the high speed, air-breathing propulsion system when injected into the high speed, air-breathing propulsion system.

* * * * *